US011692286B2

(12) United States Patent
Leger et al.

(10) Patent No.: US 11,692,286 B2
(45) Date of Patent: Jul. 4, 2023

(54) OUTPUT LEVER WITH CAM FOLLOWER ROLLERS FOR A CAM SHED-FORMING MECHANISM AND ITS MANUFACTURING METHOD, SHEDDING MACHINE EQUIPPED WITH SUCH A LEVER AND LOOM EQUIPPED

(71) Applicant: STAUBLI FAVERGES, Faverges-Seythenex (FR)

(72) Inventors: Sylvain Leger, Annecy (FR); David Bonneau, Lathuile (FR); Francois Pollet, Annecy le Vieux (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 204 days.

(21) Appl. No.: 17/337,538

(22) Filed: Jun. 3, 2021

(65) Prior Publication Data

US 2021/0388541 A1    Dec. 16, 2021

(30) Foreign Application Priority Data

Jun. 11, 2020 (FR) ..................................... 2006114

(51) Int. Cl.
*D03C 5/02* (2006.01)
*D03C 5/04* (2006.01)
(Continued)

(52) U.S. Cl.
CPC ............... *D03C 5/04* (2013.01); *F16H 53/06* (2013.01); *D03C 2700/0105* (2013.01)

(58) Field of Classification Search
CPC .... D03C 5/04; D03C 2700/0105; D03C 5/02; D03C 5/00; F16H 53/06
See application file for complete search history.

(56) References Cited

U.S. PATENT DOCUMENTS

| 2,799,295 A | * | 7/1957 | Yves | ...................... D03D 47/26 |
| | | | | 139/18 |
| 3,263,512 A | * | 8/1966 | Handley | .................. F16H 53/06 |
| | | | | 74/567 |

(Continued)

FOREIGN PATENT DOCUMENTS

| CN | 203807652 U | 9/2014 |
| DE | 2503127 A1 | 7/1975 |

(Continued)

OTHER PUBLICATIONS

France Search Report dated Jan. 15, 2021, for France Patent Application 2006114 filed Jun. 11, 2020.

*Primary Examiner* — Robert H Muromoto, Jr.

(57) ABSTRACT

Output lever (11) with cam follower rollers, where the lever has two follower rollers (24A, 24B) connected to a body (110). The body defines a median plane (P11) which has a central portion (116), with two opposing surfaces (117A, 117B), and two attachment portions (122A, 122B), each connected, by means of a respective attachment device (28), to a respective follower roller. Each attachment device has an inner fastener (28A) and an outer fastener (28B), each of which has one or more flanges (30, 32, 34; 30, 32, 34, 70). The flanges are each formed in a plate and bear bears in parallel planes against each other. Each follower roller is clevis-mounted between the inner and outer fastener so that contact surfaces (S242) of the two follower rollers are located on either side of the median plane.

16 Claims, 11 Drawing Sheets

(51) Int. Cl.
*F16H 53/06* (2006.01)
*F16H 3/04* (2006.01)

(56) References Cited

U.S. PATENT DOCUMENTS

| | | | | |
|---|---|---|---|---|
| 3,807,460 A * | 4/1974 | Alexandr | ................. | D03C 1/12 |
| | | | | 139/76 |
| 3,831,457 A * | 8/1974 | Kern | ......................... | F01L 1/14 |
| | | | | 74/569 |
| 4,716,939 A * | 1/1988 | Palau | ...................... | D03C 5/02 |
| | | | | 74/569 |
| 8,919,223 B2 * | 12/2014 | Corniani | ................ | F16H 53/04 |
| | | | | 74/568 R |
| 9,873,961 B2 * | 1/2018 | Cittadini | ................ | D03C 5/005 |
| 2021/0148014 A1 * | 5/2021 | Pollet | ..................... | F16C 19/16 |

FOREIGN PATENT DOCUMENTS

| | | |
|---|---|---|
| EP | 1730338 | 4/1996 |
| EP | 1730338 A1 | 4/1996 |
| EP | 3162933 A1 | 5/2017 |
| WO | 2005098106 A1 | 10/2005 |

\* cited by examiner

OUTPUT LEVER WITH CAM FOLLOWER ROLLERS FOR A CAM SHED-FORMING MECHANISM AND ITS MANUFACTURING METHOD, SHEDDING MACHINE EQUIPPED WITH SUCH A LEVER AND LOOM EQUIPPED

The present invention relates to an output lever with cam follower rollers used in a shed-forming mechanism, and to a manufacturing method for such a lever. The invention also relates to a shedding machine comprising such a lever and to a loom equipped with such a machine.

In the field of weaving looms, cam shed-forming mechanism are known, which comprise a series of oscillating levers equal in number to the maximum number of heald frames to be mounted on a loom, each oscillating lever, also known as an output lever, being intended to be coupled to one of the frames and equipped with two rollers which interact with the two followers of a complementary cam driven in rotation by a common shaft. The conjugate followers of the same cam are axially offset and the rollers carried by the associated lever must have the same axial offset as the followers of the cam.

For this purpose, it is known, for example from CN-U-203807652, of clevis-mounting the rollers on the lever body by means of two flanges, a first flange directly formed in the thickness of the lever body by machining on a lateral surface of the lever, while a second flange is fixed to the lever body by means of rivets. Machining the first flange into the body is an operation which, in addition to being costly, is likely to release internal stresses in the material and cause deformations which appear after machining. An additional straightening operation is then necessary to compensate for these deformations, the positioning of the rollers in relation to the cams having to be very precise in order to limit the torsional forces and limit the risks of premature failure of the levers.

It is also known, for example from EP-A-1730338 or EP-3 162 933-A1, of mounting each roller between two flanges of a pair of flanges, the flanges being fixed to the lever body. A first flange of each pair of flanges is partially engaged in a hollow recess machined on a side surface of the body. Again, the machining operation is costly and usually requires an additional straightening step.

The invention intends to remedy these drawbacks by proposing a new lever with rollers that is simple and inexpensive to manufacture.

To this end, the invention relates to an output lever with cam follower rollers of a cam shed-forming mechanism, which comprises a body and two cam follower rollers. The body of the output lever, formed in a plate with two opposite faces defining a median plane between them, comprises a central portion with two opposite surfaces, in which a bore is formed, centered on a main axis receiving a bearing, two attachment portions and an extension, the attachment portions and the extension being formed radially to the main axis and being distinct from each other. Each follower roller is offset from the median plane along the main axis and comprises an inner ring, an outer ring and rolling elements interposed between the inner and outer rings such that the outer ring is free to rotate relative to the inner ring about a roller axis parallel to the main axis, the outer ring having a contact surface, which is radial to the roller axis and intended for contact with a follower of a cam of the shed-forming mechanism. Each follower roller is connected to a respective attachment portion by means of a respective attachment device, each attachment device comprising an inner attachment located on the side of the other follower roller in relation to the inner ring and an outer attachment located on the opposite side of the other follower roller in relation to the inner ring, the inner and outer attachments each comprising one or more flanges, each of which is or are formed in a plate, which are supported with each other, in parallel planes, and which are connected to each other. Each follower roller is clevis-mounted between an inner flange of an inner attachment and an outer flange of an outer attachment and is fixed to the inner and outer flanges by an attachment, the outer attachments are connected to the corresponding attachment portion by lever rivets, the outer attachment resting in parallel planes on one of the faces of the corresponding attachment portion in such a way that the contact surfaces of the two follower rollers are situated on either side of the median plane. According to the invention, at least one of the follower rollers, called the first follower roller, is fixed to a first of the two attachment portions by means of a first attachment device, while the first attachment portion of the output lever comprises two opposite surfaces that are connected to each other by a flange and separated from each other by a distance equal to a thickness of the central portion, so that each of the two surfaces of the first attachment portion is coplanar with a respective surface of the central portion, and the contact surface of the first follower roller is located opposite the flange of the first attachment portion.

By means of the invention, the device for attaching the rollers to the body of the output lever comprises parts formed of plates or spacer rings, in other words parts with simple geometries, which are inexpensive to manufacture. The attachment portions have a constant thickness and do not require any surface machining for mounting the rollers, which is economical. The rollers are attached to the lever body by an assembly of plates and rings attached by means of fasteners such as rivets, such an assembly being simple to make and durable.

According to advantageous but non-mandatory aspects of the invention, such an output lever may incorporate one or more of the following features taken in any technically permissible combination:

the inner and outer fasteners of the first fastening device are assembled by means of clevis rivets;

the outer fastener comprises an outer flange and a spacer flange, the outer and spacer flanges each being formed in a respective plate and being joined together by riveting, the outer flange having an inner face and an opposing outer face, the inner face of the outer flange bearing on the first follower roller the outer flange being fixed to the first follower roller by the attachment, while the spacer flange is assembled to the first attachment portion by means of the lever rivets, the spacer flange being interposed between the outer flange and the first attachment portion in such a way as to offset the inner face of the outer flange in relation to a first of the two surfaces of the first attachment portion;

the inner attachment of the first fastening system comprises an inner flange, which is formed in a plate and has an outer face and an opposing inner face and which abuts the first follower roller, the inner flange being attached to the first follower roller by means of the attachment device, while the inner flange rests on the outer fastener by means of one or more struts formed in a plate, so that the inner face of the inner flange and the inner face of the outer flange are parallel to each other and separated by a distance equal to the thickness of the first follower roller, except for the assembly clearances;

each strut is attached to the inner flange and to the outer fastener by means of one or more clevis rivets;

the one or more clevis rivets attach to the inner flange of the inner fastener and to the outer flange of the outer fastener, the spacer flange of the outer fastener and each strut;

the inner attachment comprises a reinforcing flange, which is formed in a plate and has an inner face and an opposite outer face, the inner face of the reinforcing flange resting together on the outer face of the inner flange and on a second of the two surfaces of the first attachment portion, the reinforcing flange being fixed to the first attachment portion by means of the lever rivets, on the one hand and, on the other, fixed to the inner flange by means of the clevis rivets;

the two follower rollers are mounted to a respective attachment portion by means of a respective attachment device, each attachment device being similar, preferably identical, to the first attachment device;

the outer flanges of the two attachment devices are identical;

the inner flanges of the two fastening devices are identical, and each fastening device comprises two fasteners, such as rivets, each inner ring has a disc shape centered on the respective roller axis and defines an inner half-disc and an outer half-disc complementary to the inner half-disc, the inner half-disc of each follower roller being located on the side of the other follower roller, while the fasteners of each follower roller are arranged in the outer half-disc of this follower roller.

The invention also relates to a cam shed-forming mechanism that comprises an output lever as described above.

According to another aspect, the invention relates to a weaving loom, equipped with such a mechanism.

Finally, the invention relates to a method of assembling an output lever as described above, the assembly method comprising the steps of:

a) stacking the inner flange, the struts, the spacer flange and the outer flange in a positioning tool, so as to make all the clevis rivet through-holes coincide;

b) inserting the clevis rivets into the corresponding through holes and then deforming the clevis rivets under pressure so as connect the inner flange, strut, spacer flange and outer flange are to each other and together form a fastener subassembly;

c) positioning the outer fastener of the fastener subassembly on the corresponding attachment portion so as to align the lever rivet holes;

d) inserting the lever rivets into the corresponding through holes and then deforming the lever rivets under pressure so as to secure the fastener subassembly to the corresponding attachment portion;

e) positioning the follower between the inner and outer flanges of the corresponding fastener so as to align the through-holes of the fastener, and f) inserting the fastening device into the corresponding through holes and then deforming the fastening device under pressure so as to secure the follower roller to the fastening subassembly.

Advantageously:

in step a) of the assembly method, the reinforcing flange is inserted together with the inner flange, while after step b), the reinforcing flange is part of the fastener subassembly, and the assembly method comprises an intermediate step, subsequent to step d) and prior to step e), the intermediate step consisting of further machining the through holes of the attachments and the bore of the lever body.

The invention will be better understood, and other advantages thereof will become clearer in the light of the following description of five embodiments of an output lever of a cam shed-forming mechanism and its associated manufacturing method, of a shedding machine of the cam shed-forming mechanism type equipped with such a lever, and of a loom equipped with such a mechanism according to its principle, given by way of example only and made with reference to the appended drawings, in which.

Figure 1:
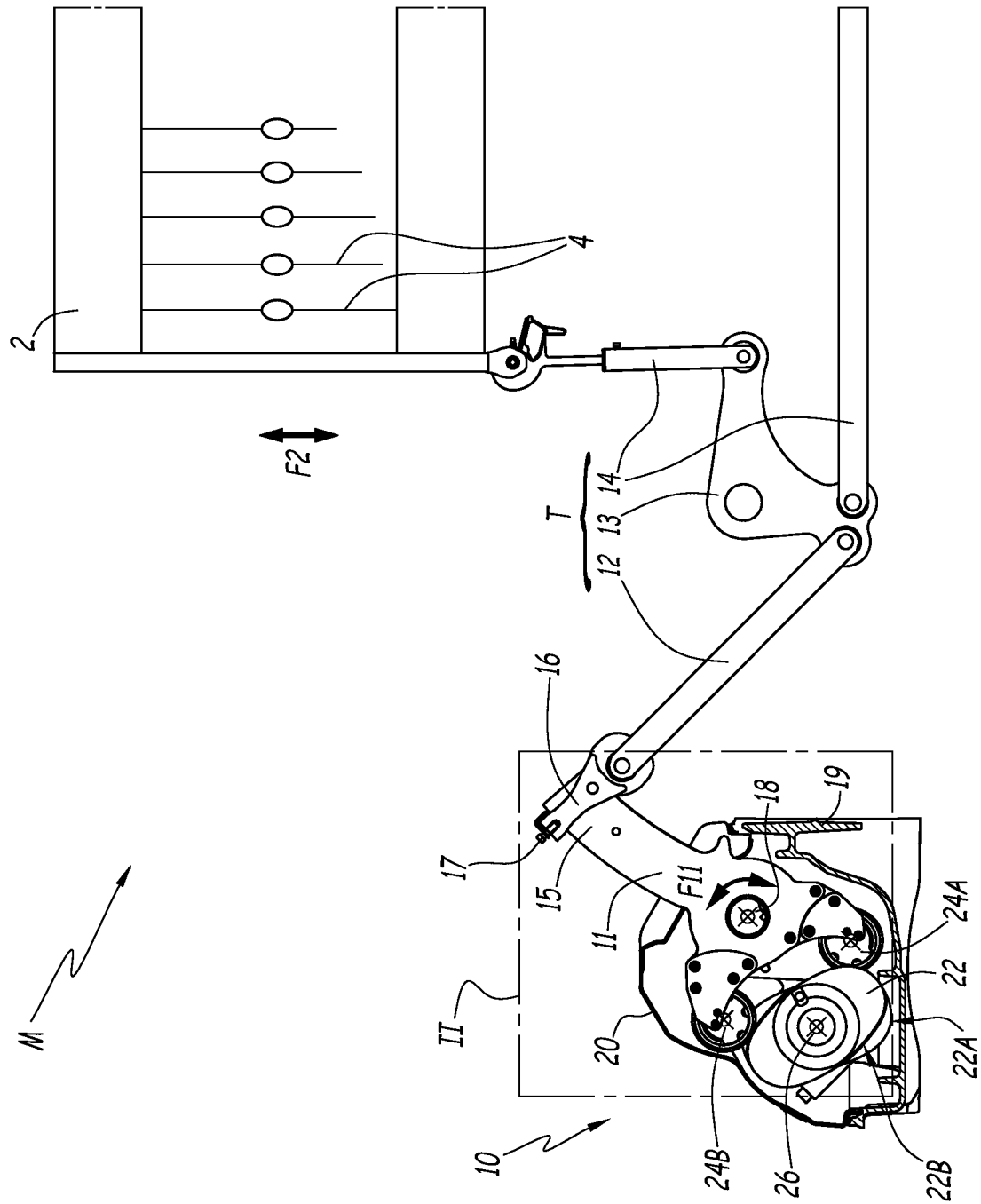
FIG. 1 is a schematic partial representation of the loom principle according to the invention.

A loom M is shown in FIG. 1. The loom M is equipped with frames 2 with heddles 4, each provided with an eyelet for the passage of one or more warp threads. The different frames 2 of the loom M are animated by a vertical oscillation movement represented by the double arrow F2 and generated by a shed-forming mechanism 10, whose output levers 11 respectively engage transmission rods 12 associated with return levers 13 connected to each other and to the frame 2 by rods 14. For each frame 2, the transmission rod 12, the return lever 13 and the rods 14 are part of a sub-assembly, called the transmission T. Each transmission rod 12 is connected at one end to an extension 15 of the associated lever 11 by means of a clip 16, attached to the extension 15 by means of a clamping screw 17. The clip 16 and the clamping screw 17 are only shown in FIG. 1.

The levers 11 are provided in a number equivalent to the maximum number of heald frames 2 of the loom M and are pivotally mounted, as represented by the double arrow Fl1, around an output shaft 18 supported by the casing 19 of the shed-forming mechanism 10 and partially protected by a cover 20. In FIG. 1, the output shaft 18 is centered on an axis orthogonal to the plane of FIG. 1. Unless otherwise noted, the movements of the various parts are in the plane of FIG. 1, in particular the rotational movements of the parts are about axes orthogonal to the plane of FIG. 1. The axes of rotation of the various parts are thus parallel to each other.

Thus, by distributing the warp threads over at least two frames 2 connected to output levers 11 animated by oscillation movements F11 in phase opposition, the warp threads can open to allow the passage of a weft thread and close to allow the incorporation of this weft thread into the fabric.

Only one of the heald frames 2 and only one of the levers 11 are shown in FIG. 1.

The shed-forming mechanism 10 also comprises multiple complementary cams, only one of which is shown with reference 22, each of which defines two conjugate followers 22A and 22B, on which two follower rollers 24A and 24B supported by a lever 11 respectively come to bear. By extension, the shed-forming mechanism 10 is also called a cam shed-forming mechanism. This cam shed-forming mechanism 10 is used on the loom M.

The cams 22 are mounted on a camshaft 26, which is rotatable relative to the frame 16 about an axis parallel to the axis of the output shaft 18. The camshaft 26 is directly or indirectly driven in rotation by a loom shaft or by a motor, which are not shown.

Figure 2:
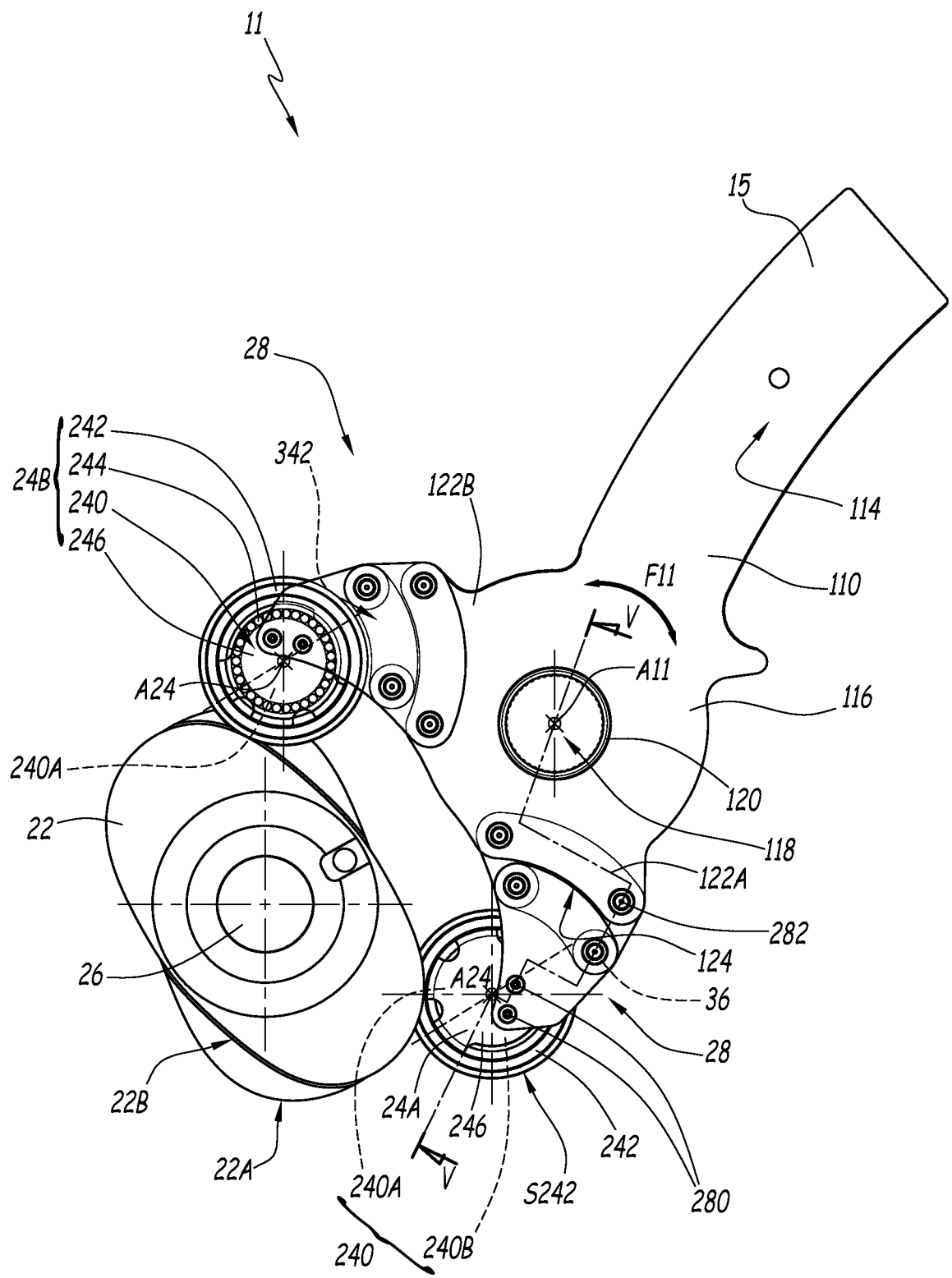
FIG. 2 is a larger scale view of detail II in FIG. 1, comprising an output lever according to a first embodiment of the invention, with some parts omitted for ease of reading.
Figure 3:
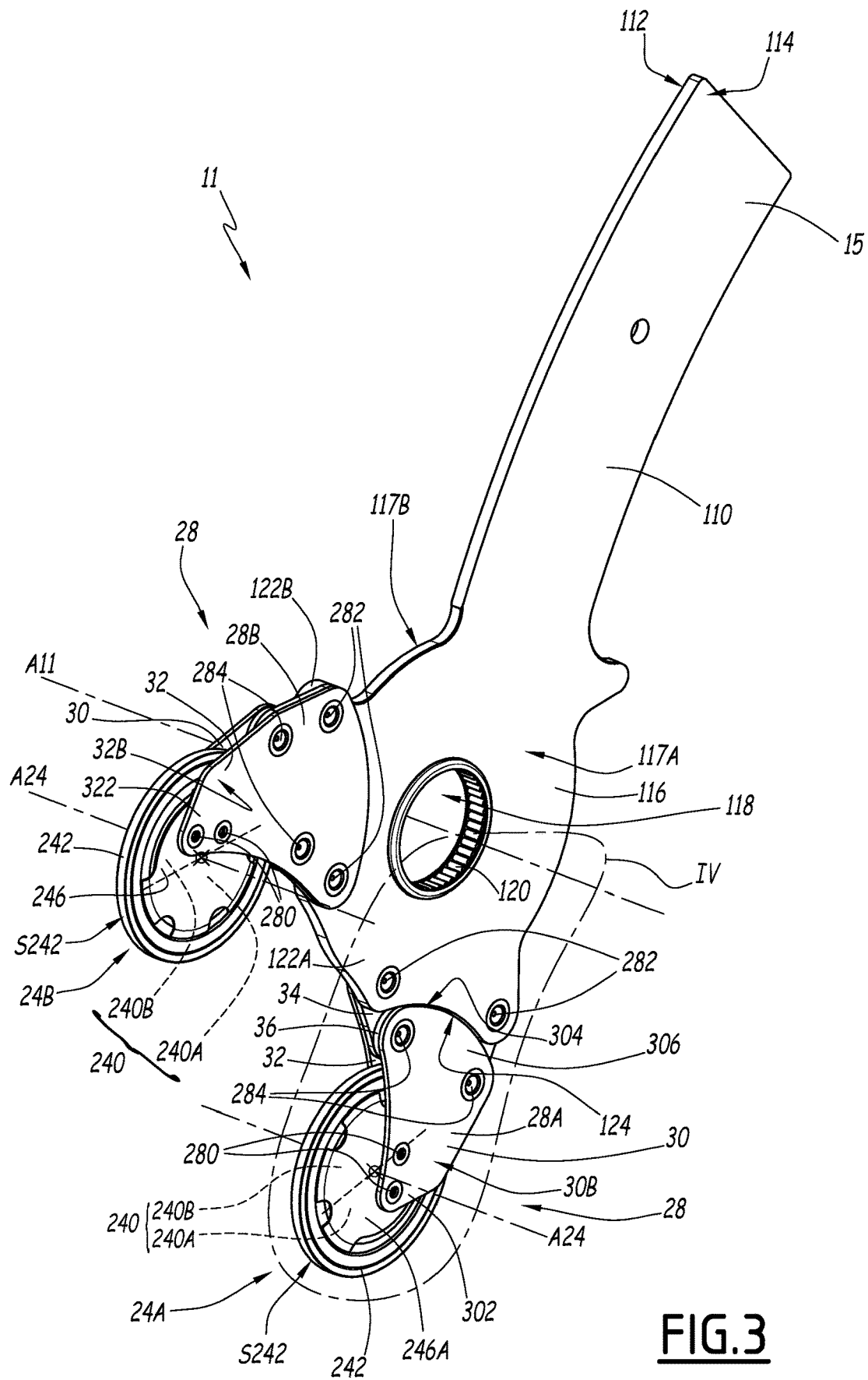
FIG. 3 is a perspective view of the output lever of FIG. 2.
Figure 4:
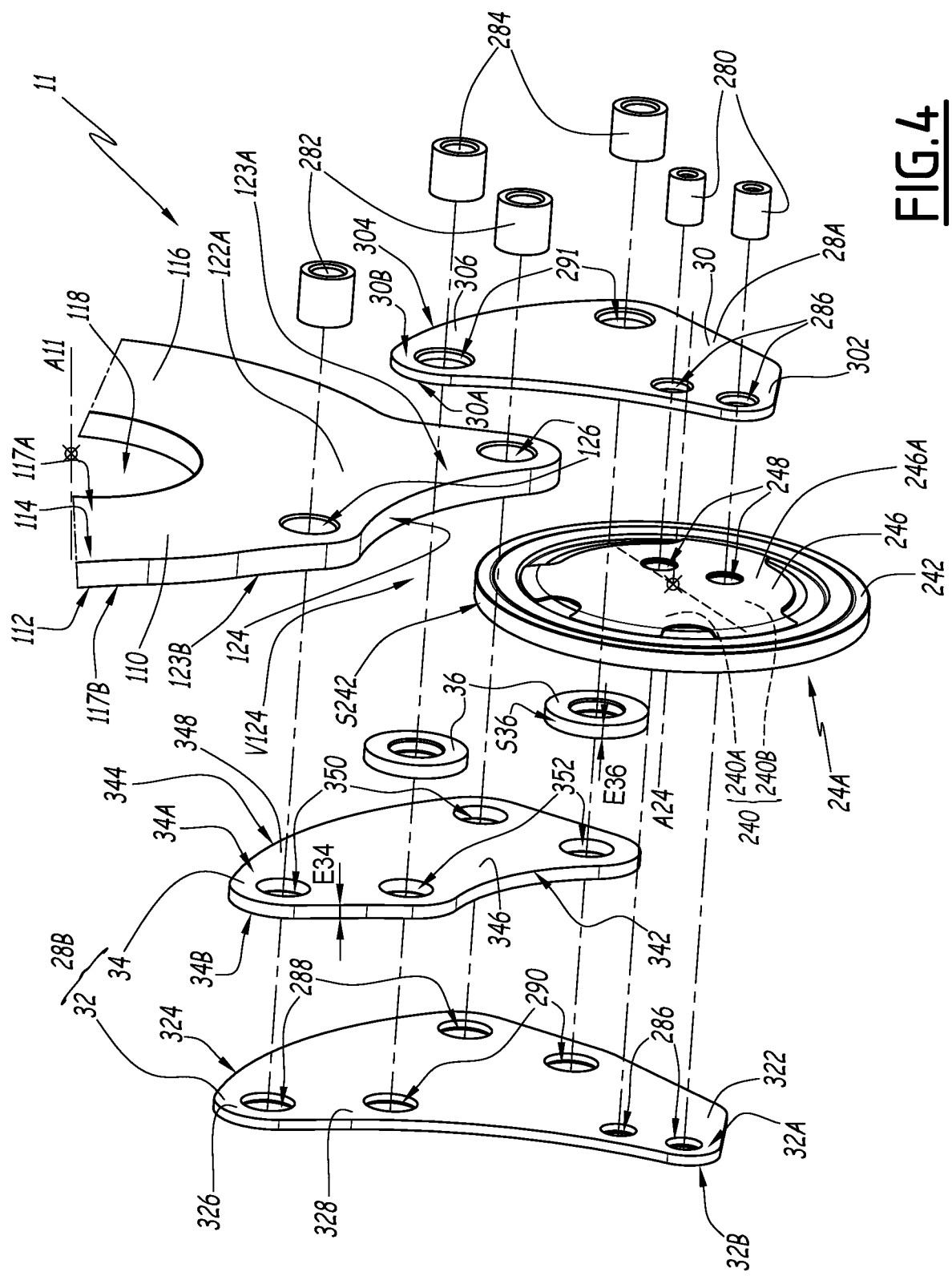
FIG. 4 is an exploded perspective view of detail IV in FIG. 3.
Figure 5:
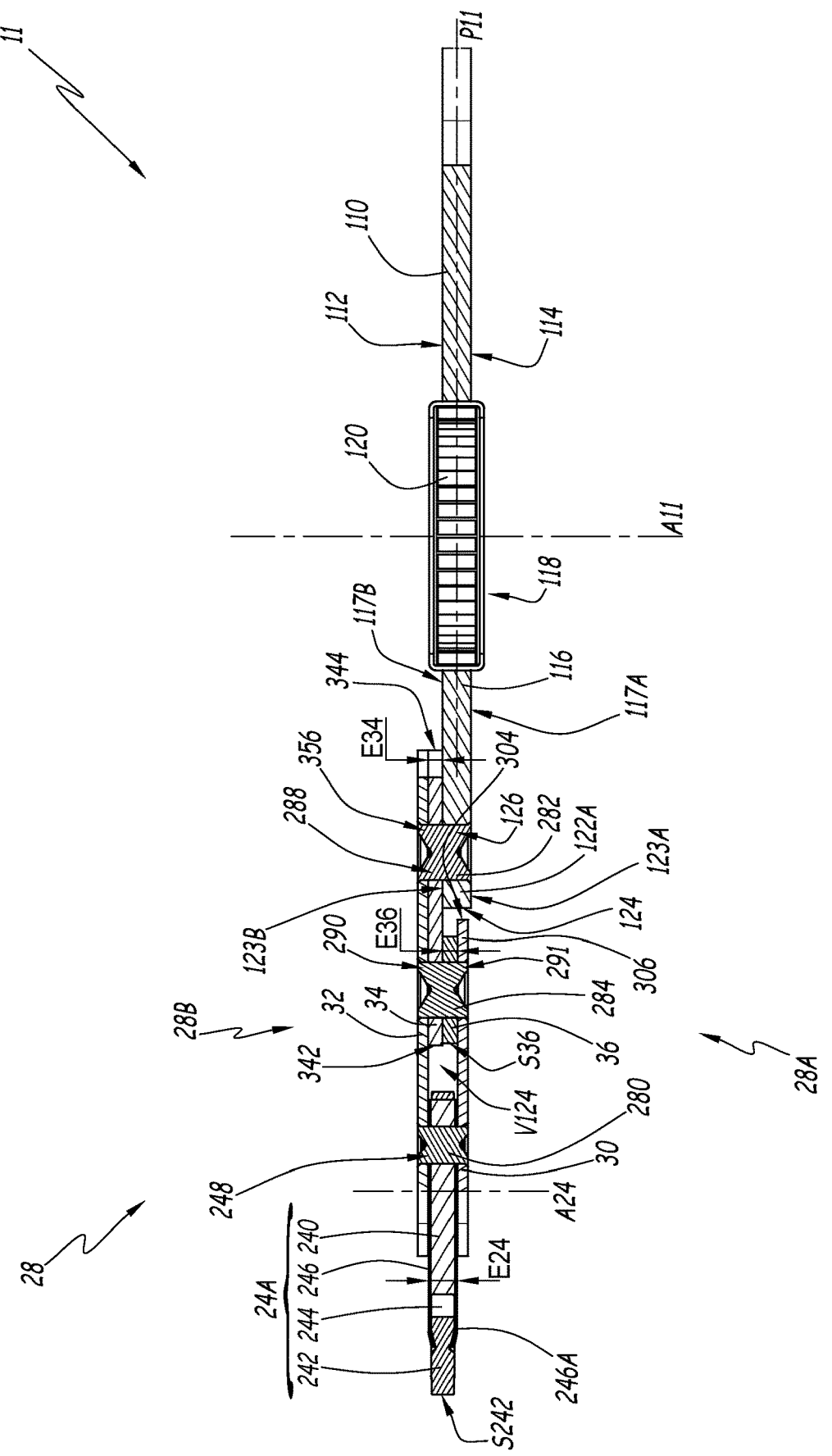
FIG. 5 is a partial cross section along the line V-V in FIG. 2.
Figure 6:
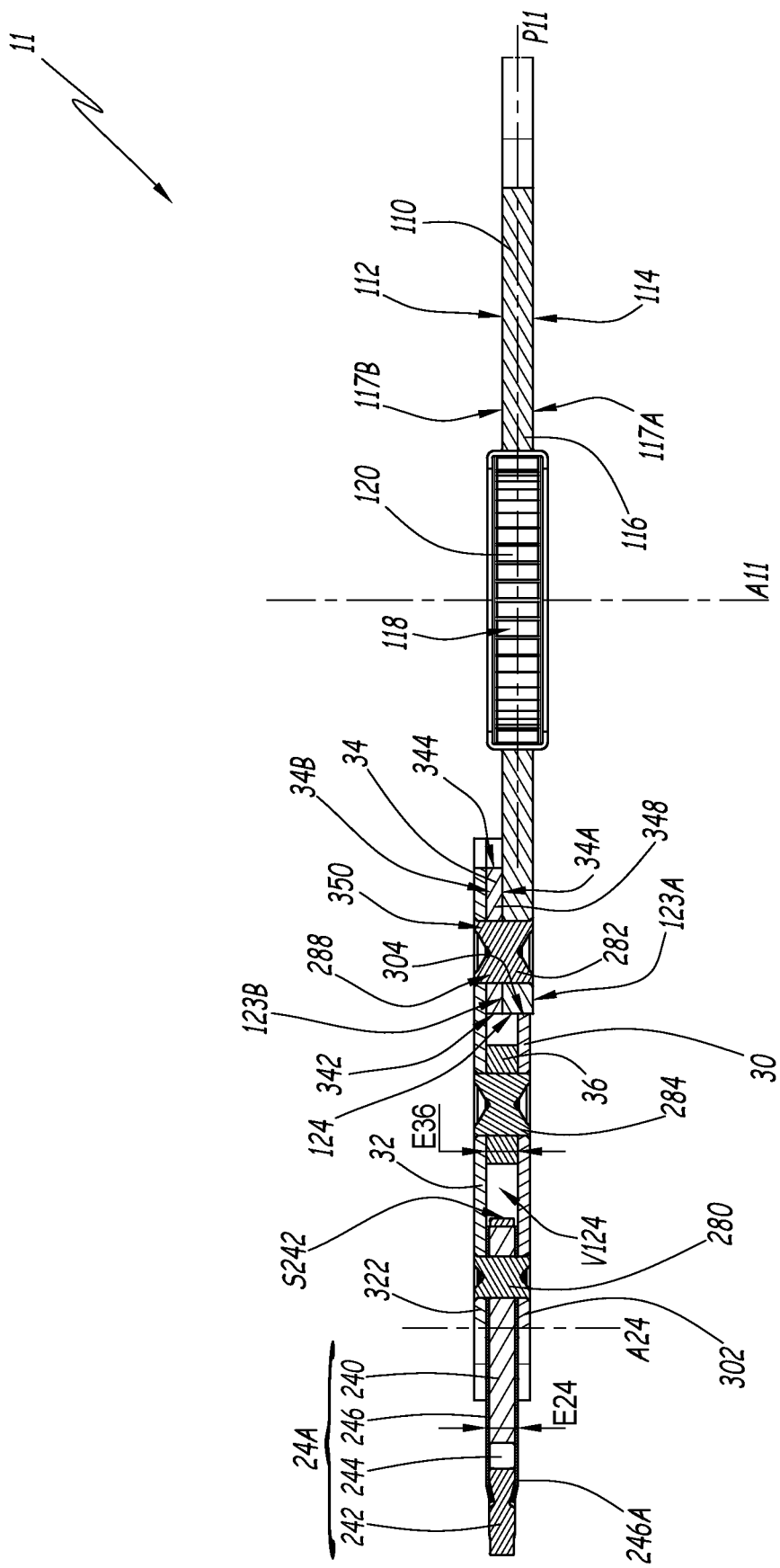
FIG. 6 is a view similar to FIG. 5, of an output lever according to a second embodiment of the invention.
Figure 7:
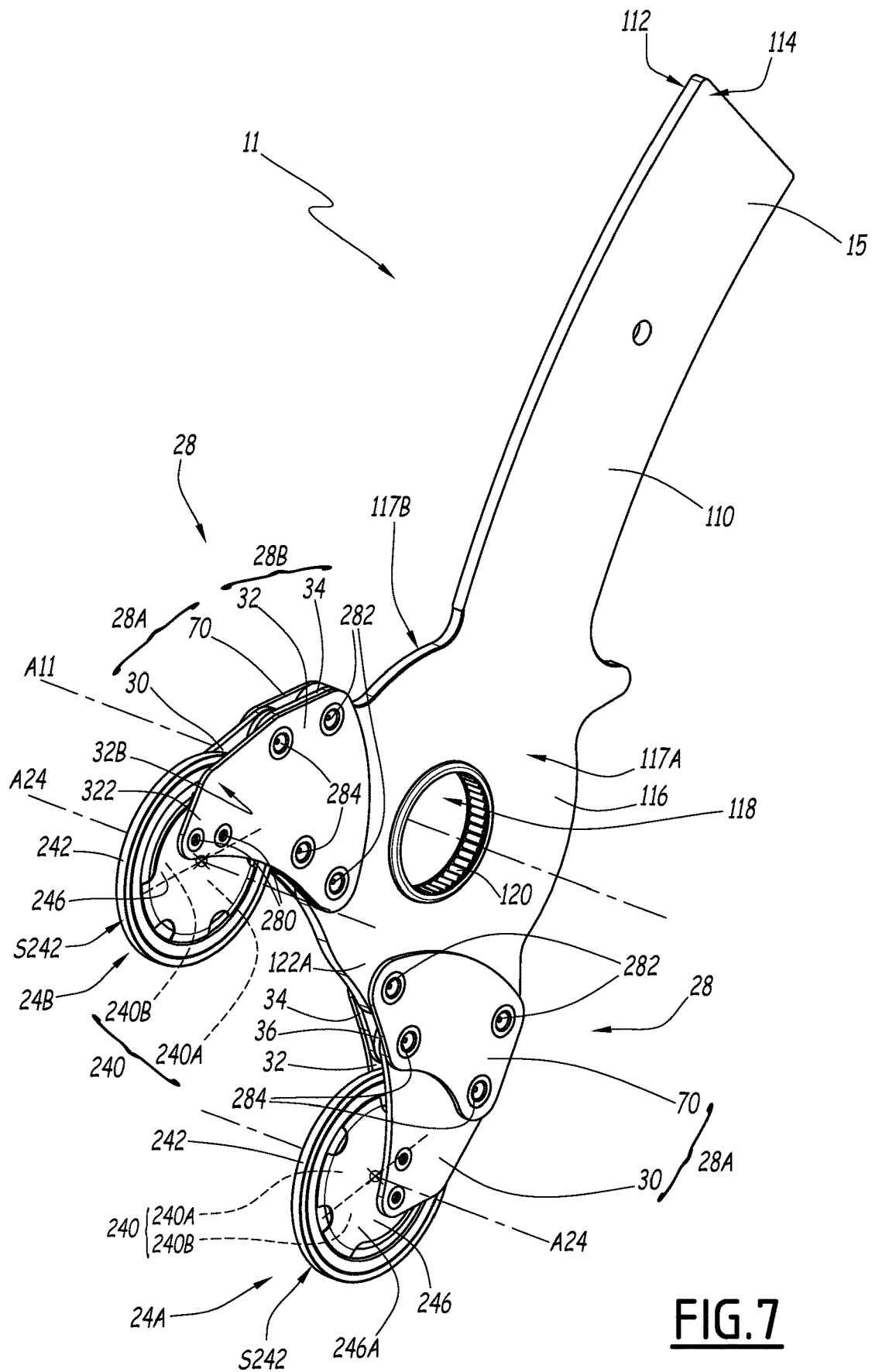
FIG. 7 is a view similar to FIG. 3, of an output lever according to a third embodiment of the invention.
Figure 8:
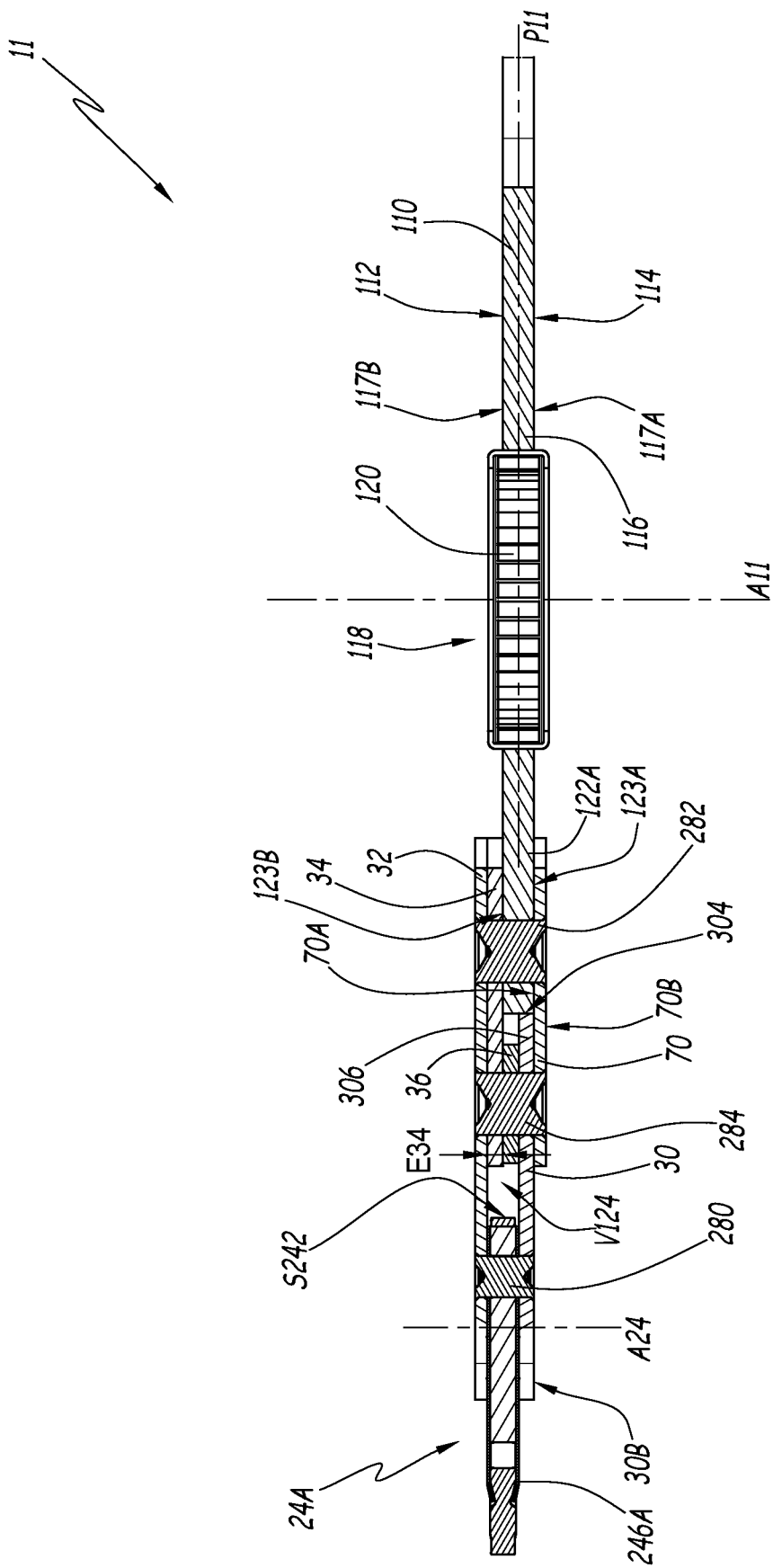
FIG. 8 is a partial cross-sectional view, similar to FIG. 5, of the output lever of FIG. 7.
Figure 9:
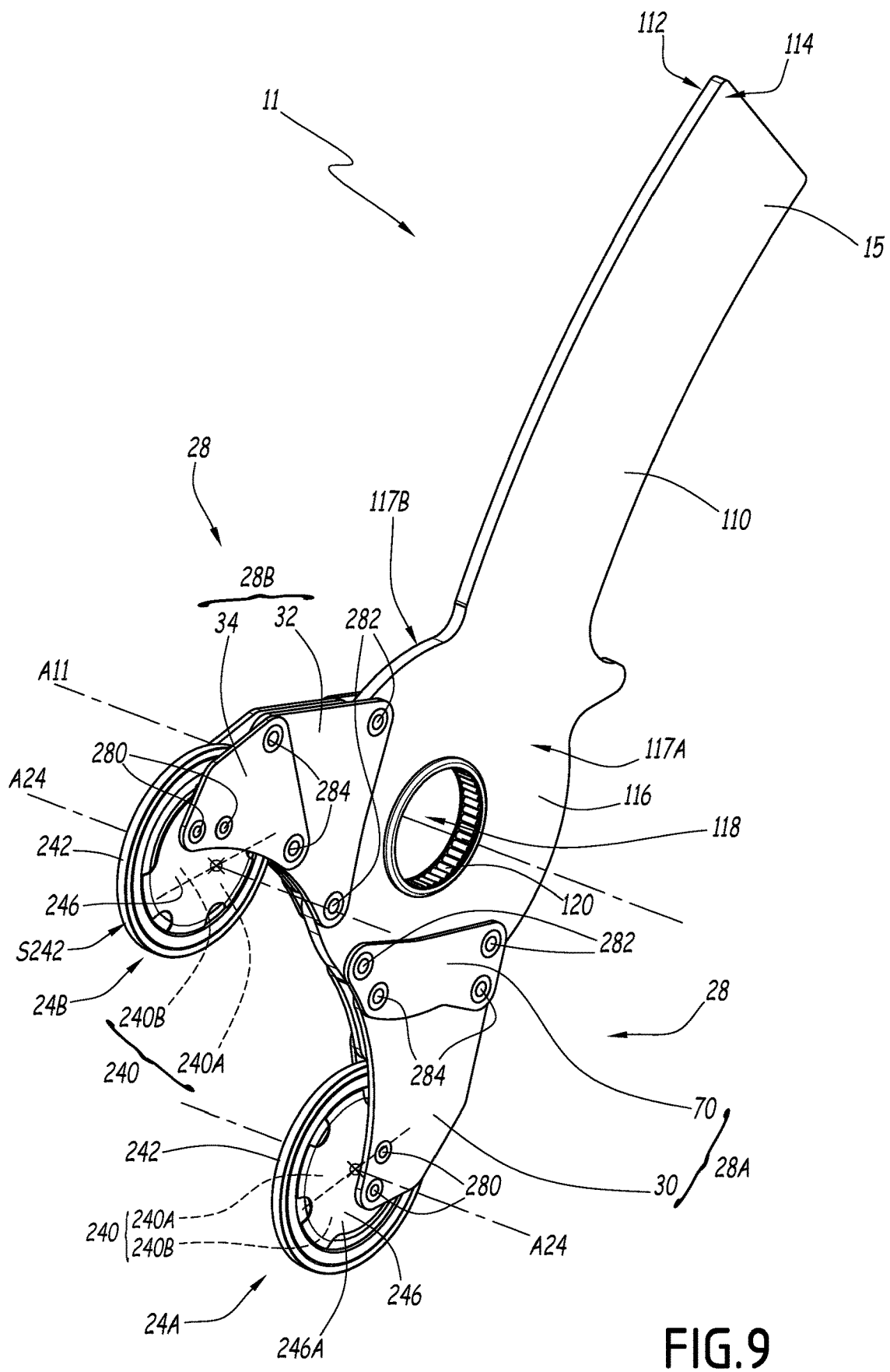
FIG. 9 is a view similar to FIG. 3, of an output lever according to a fourth embodiment of the invention.
Figure 10:
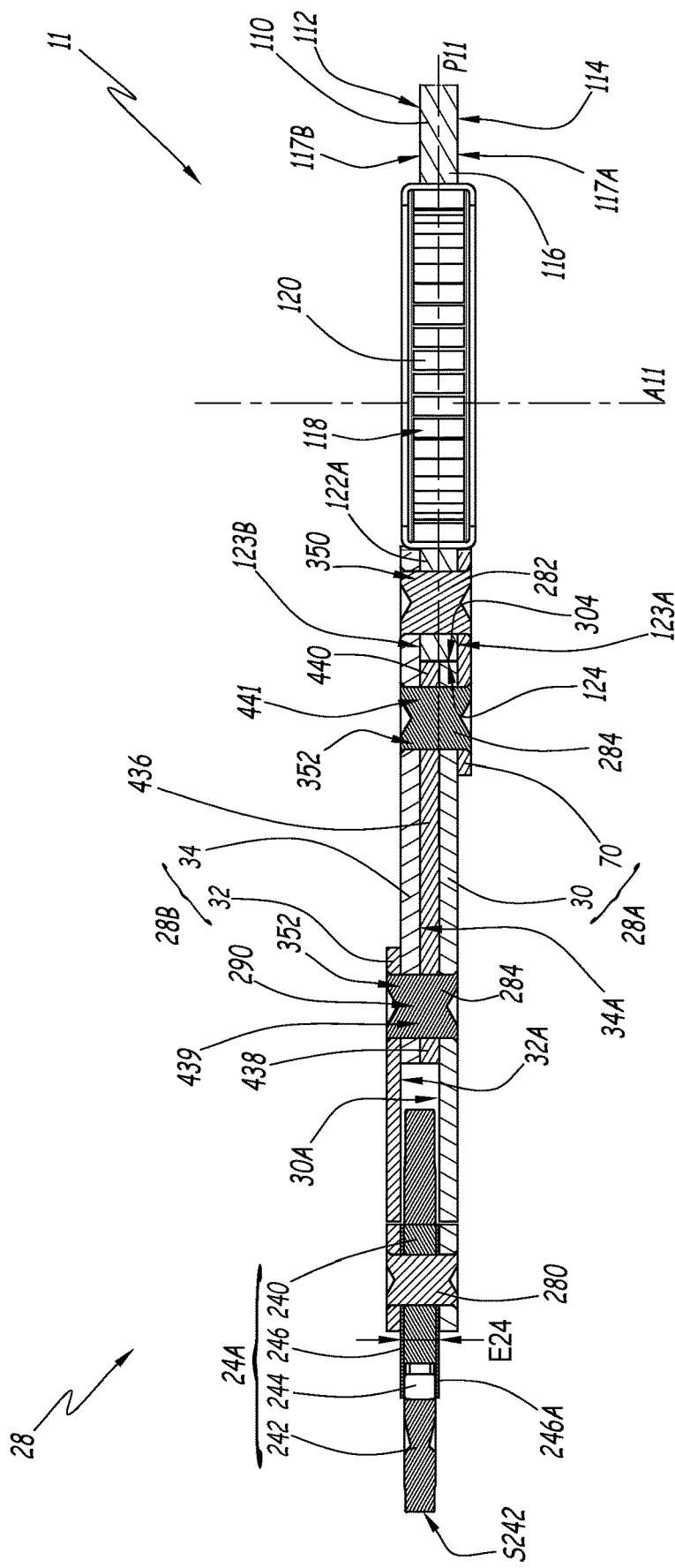
FIG. 10 is a partial cross-sectional view similar to FIG. 5, of the output lever of FIG. 9.
Figure 11:
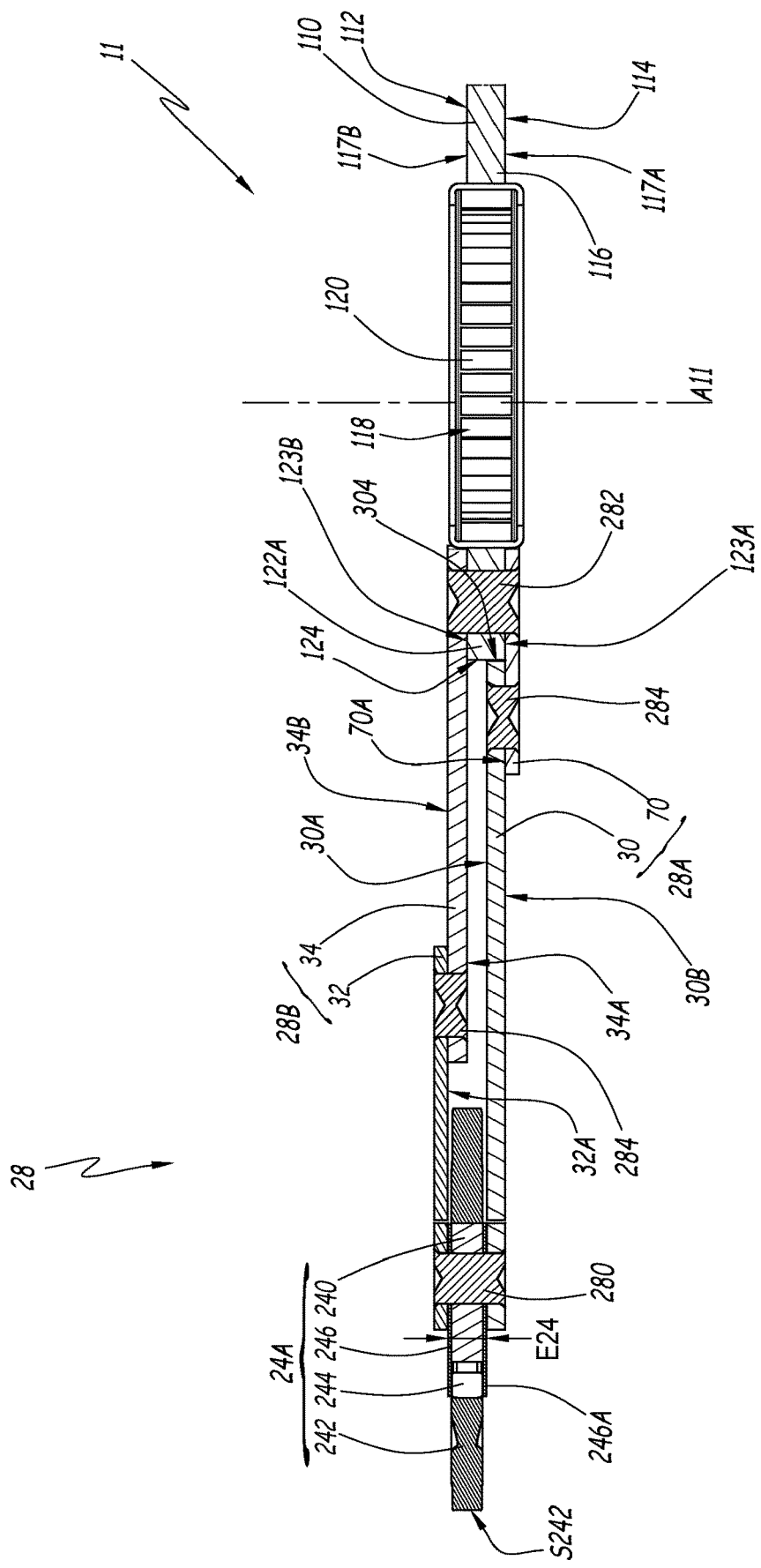
FIG. 11 is a partial cross-sectional view, similar to FIG. 5, of an output lever according to a fifth embodiment of the invention.

The lever 11, visible in particular in FIGS. 2 and 3, comprises a body 110, is formed in a plate made of a rigid and resistant material, such as steel, and has two opposite faces 112 and 114, which are flat over the entire body 110 and are parallel to each other. The body 110 has a constant thickness on all the faces 112 and 114 and defines a median plane P11. The two faces 112 and 114 are thus parallel to and equidistant from the median plane P11.

The body 110 comprises a central portion 116, in which a bore is formed 118, centered on a main axis A11, which is orthogonal to the median plane P11. The bore 118 receives a bearing 120 for mounting the lever 11 on the output shaft 18. The output shaft 18 is thus centered on the main axis A11. The bearing 120 in this case is a needle bearing. The bore 118 must be precisely defined in order to allow proper positioning of the output lever 11 in relation to its environment, in particular to prevent two adjacent output levers 11 from touching each other during their oscillating movements. A surface 117A is defined as a portion of the face 114 corresponding to the central portion 116. Similarly, a surface 117B is defined as a portion of the face 112 corresponding to the central portion 116. The surface 117A is thus oriented away from the surface 117B.

The body 110 also comprises two attachment portions 122A and 122B, the attachment portions 122A and 122B and the extension 15 formed radially to the main axis A11 and distinct from each other. The attachment portion 122A is connected to the follower roller 24A, while the attachment portion 122B is connected to the follower roller 24B, each follower roller 24A or 24B being connected to the corresponding attachment portion via a respective attachment device 28, which is detailed below, such that each follower roller 24A and 24B is offset from the median plane P11 along the main axis A11.

The faces 112 and 114 of the body 110 comprise the attachment portions 122A and 122B; in other words, the attachment portions 122A and 122B have faces parallel to the median plane P11 with a constant thickness.

In the example shown in the figures, the two follower rollers 24A and 24B advantageously have the same structure, or even are identical, which reduces standardization costs. Similarly, the attachment devices 28 associated with each of the rollers 24A or 24B advantageously have the same structure, or are even identical. On the other hand, the attachment portions 122A and 122B of the body 110 each have a similar shape to each other. In the following, the follower roller 24A connected to the attachment portion 122A and the associated attachment device 28 are mainly described, this description being transposable to the roller 24B attached to the attachment portion 122B by means of its own attachment device 28.

A surface 123A is defined as a portion of the face 114 corresponding to the attachment portion 122A. Similarly, a surface 123B is defined as a portion of the face 112 corresponding to the attachment portion 122A. The surface 123A is orientated opposite to the surface 123B.

The surface 123A of the attachment portion 122A is thus coplanar with the surface 117A of the central portion 116, while the surface 123B of the attachment portion 122A is coplanar with the surface 117B of the central portion 116. The surfaces 123A and 123B are connected to each other by a flange 124, which has a cylindrical surface with a generator parallel to the main axis A11. In particular, the surfaces 123A and 123B do not have any recess in relation to the surfaces 117A or 117B and are separated from each other by a thickness equal to a thickness of the central portion 116.

The edge between the flange 124 and each of the surfaces 123A and 123B may have a rounding or chamfer, to prevent an operator from being injured when manipulating the lever 11.

The follower roller 24A comprises an inner ring 240, which has a disk shape centered on a respective roller axis A24, an outer ring 242, and rolling elements 244 interposed between the inner 240 and outer 242, such that the outer ring 242 is free to rotate relative to the inner ring 240 about the respective roller axis A24. When the roller 24A is connected to the attachment portion 122A via the attachment device 28, the roller axis A24 is parallel to the main axis A11. The outer ring 242 has a contact surface S242, which is radial to the roller axis A24 and is intended for contact with the follower 22A of the cam 22. The contact surface S242 is in this case a portion of a cylinder of circular cross section centered on the corresponding axis A24.

The rolling elements 244, which in this case are rollers, are held axially in relation to the roller axis A24 by two flanks 246, which are located on either side of the inner ring 240, along the roller axis A24. The inner ring 240 and the outer ring 242 are, for example, made of steel plates with a thickness of between 2 mm and 20 mm, for example, while the flanks 246 are made of treated steel sheets with a thickness of between 0.1 mm and 1 mm, for example.

For each roller 24A or 24B, a thickness of the roller E24 is defined, equal to a cumulative thickness of the inner ring 240 and the two flanks 246, measured parallel to the corresponding axis A24.

Two holes 248 are formed through the inner ring 240 and the flanks 246. Each hole 248, centered on an axis parallel to the roller axis A24, allows for the passage of a fastener 280 of the attachment device 28. In the illustrated example, the fastener 280 received in each of the holes 248 is a rivet, referred to as a "roller rivet".

When the roller 24A comprises only one hole 248 receiving a fastener 280 as is the case in the prior art, the hole 248 is aligned with the roller axis A24 because there remains a risk that the inner ring 240 of the roller A24 will rotate relative to the attachment device 28 about an axis centered on the hole 248.

In the illustrated example, each attachment device 28 comprises two fasteners 280, with the follower roller 24A comprising two separate holes 248, each receiving a respective fastener 280. Rotational movements of the inner ring 240 relative to the attachment device 28 are thus prevented.

Advantageously, the fasteners 280, and thus the holes 248 formed in the inner ring 240 of the follower roller A24, are further from the other follower roller 24B than the roller axis A24 of the follower roller 24A.

In other words, the inner ring 240 has a disk shape centered on the roller axis A24 and defines an inner half disk 240A and an outer half disk 240B, complementary to the inner half disk 240A, with the inner half disk 240A of the follower roller 24A located on the side of the other follower roller 24B. The holes 248 of the inner ring 240 of the follower roller 24A are formed through the outer half disk 240B of this inner ring 240, that is, these holes 248 are further from the roller axis A24 of the other follower roller 24B than the axis A24 of the inner ring 240 in which these holes 248 are drilled.

Symmetrically, the holes 248 formed in the inner ring 240 of the follower roller 24B are further from the roller axis A24 of the follower roller 24A than the roller axis A24 of the follower roller 24B.

This configuration allows for cam followers 22A and 22B of cam 22 with conjugate profiles to have significant differences in radii, without the risk of interference of the followers 22A or 22B with the attachment devices 28 of the lever 11. This increases the accelerations of the oscillating movement F11 of the lever 11, and thus the productivity of the loom M.

When the roller 24A is attached to the attachment portion 122A, the contact surface S242 is located opposite the flange 124. The flange 124 and the contact surface S242 define an intermediate volume V124. In the illustrated example, the flange 124 has the shape of a circular cross-section portion of a cylinder centered on the roller axis A24 when the roller 24A is attached to the attachment portion 122A. In other words, the flange 124 is concentric with the contact surface S242, and the intermediate volume V124 has a constant width measured radially to the roller axis A24.

Two holes 126 are formed through the attachment portion 122A close to the flange 124, that is, closer to the flange 124 than to the bore 118. Each hole 126, centered on an axis parallel to the main axis A11, allows the passage of a fastener 282 of the attachment device 28, which in this case is another rivet, known as a "lever rivet".

The attachment device 28, which connects the follower roller 24A to the attachment portion 122A of the body 110 of the lever 11, is now described. In addition to the previously introduced roller rivets 280 and lever rivets 282, the attachment device 28 comprises an inner fastener 28A and an outer fastener 28B. The inner fastener 28A connected to the follower roller 24A is located on the side of the other follower roller 24B in relation to the inner ring 240 of the follower roller 24A, while the outer fastener 28B connected to the follower roller 24A is located on the opposite side of the other follower roller 24B in relation to the inner ring 240 of the follower roller 24A. The inner fastener 28A comprises an inner flange 30, while the outer fastener 28B comprises an outer flange 32 and a spacer flange 34. The follower roller 24A is clevis mounted between the inner flange 30 of the inner fastener 28A and the outer flange 32 of the outer fastener 28B. In the first embodiment, the attachment device 28 also comprises struts 36, each of which is formed in a plate and each is ring-shaped in this case, with a thickness E36 and a peripheral surface S36.

The inner flanges 30 and outer flanges 32 are each formed in a plate of a rigid material such as steel, and each has a substantially triangular shape, with rounded edges and corners. For each of the inner and outer flanges 30 and 32, one of the triangle vertices defines a front portion, referenced 302 and 322 respectively, each of the front portions 302 and 322 comprising two front holes 286 for the passage of the roller rivets 280. By "front", it is meant that the portions 302 and 322 are directed toward the follower roller 24A away from the central portion 116 of the lever 11 body 110 when the attachment device 28 is assembled to the lever 11 body 110. The follower roller 24A is attached to the inner flange 30 and outer flange 32 by means of the roller rivets 280, which are an example of an attachment of the the follower roller 24A to the inner flange 30 and outer flange 32.

The inner flange 30 comprises an inner face 30A and an outer face 30B, opposite the inner face 30A. Similarly, outer flange 32 comprises an inner face 32A and an outer face 32B opposite inner face 32A. When the inner 30 and outer 32 flanges are assembled to the roller 24A by means of the roller rivets 280, the inner 30A and 32A faces face each other and bear in parallel planes on the flanks 246 of the follower roller 24A, the inner ring 240 then being fixed in relation to the inner 30 and outer 32 flanges, while the outer ring 242 remains rotatable in relation to the inner ring 240 about the roller axis A24. In other words, the movements of the outer ring 242 are not hindered by the inner flanges 30 or outer flanges 32, and the follower roller 24A is clevis-mounted between the inner fasteners 28A and outer fasteners 28B. Opposite the front portion 302, the inner flange 30 comprises a edge 304 that defines a rear portion 306 of the outer flange 30. In the assembled configuration of the attachment device 28, the edge 304 of the inner flange 30 is located opposite the flange 124 of the attachment portion 122A.

Opposite the front portion 322, the outer flange 32 comprises an edge 324 that defines a rear portion 326 of the outer flange 32. Two rear holes 288 are formed in the rear portion 326 of the outer flange 32 adjacent the edge 324, the rear holes 288 being for the passage of lever rivets 282.

Between the front 322 and rear 326 portions, the outer flange 32 also comprises an intermediate portion 328, in which two intermediate holes 290 are formed. When the outer flange 32 is connected to the roller 24A, on the one hand, and connected to the attachment portion 122A on the other, the intermediate holes 290 open on the side of the inner face 32A, into the intermediate volume V124.

The inner flange 30 also comprises intermediate holes 291, which are aligned with the intermediate holes 290 of the outer flange 32 in the assembled configuration of the attachment device 28 and which are intended for the passage of fasteners 284, which in this case are called "clevis" rivets.

The spacer flange 34 is formed in a plate of a rigid material such as steel and comprises an inner face 34A and an outer face 34B opposite the inner face 34A. When the attachment device 28 is assembled, the outer face 34B faces the outer flange 32. The two faces 34A and 34B define a thickness E34 of the spacer flange 34 between them. The spacer flange 34 also comprises a front edge 342, which is oriented toward the roller 24A and away from the central portion 116 of the lever 11 in the assembled configuration of the roller 24A, and a rear edge 344, opposite the front edge 342. A front portion 346 and a rear portion 348 of the spacer flange 34 are also defined as being portions of the spacer flange 34 comprising the front edge 342 or the rear edge 344, respectively.

The rear portion 348 of the spacer flange 34 is interposed between the outer flange 32 and the attachment portion 122A. More specifically, the outer face 34B of the spacer flange 34 bears in parallel planes against the inner face 32A of the outer flange 32, while the inner face 34A of the spacer flange 34 bears in parallel planes against the face 112 of the body 110 of the lever 11. As a result, the follower roller 24A is offset from the median plane P11, parallel to the roller axis A24.

The rear portion 348 comprises holes 350, formed through the spacer flange 34 and intended for the passage of the lever rivets 282. Thus, in the assembled configuration of the fastener 28, the holes 126 in the attachment portion 122A, the holes 350 in the spacer flange 34, and the rear holes 288 in the outer flange 32 are aligned so as to allow the passage of the lever rivets 282.

An inner flank 246A of the roller 24A is defined as being one of the two flanks 246 on the side of the inner flange 30. The position of the inner flank 246A in relation to the median plane P11 depends on the thickness E34 of the spacer flange 34.

Thus, depending on the configuration of the followers 22A and 22B, the thickness E34 of the spacer flange 34 is chosen so that the roller 24A, bearing on the follower 22A of the cam 22, does not interfere with the follower 22B, and similarly so that the roller 24B, bearing on the follower 22B, does not interfere with the follower 22A. In particular, the contact surface S242 or the inner flank 246A of the roller 24A must not come into contact with the follower 22B.

Following the examples, the thickness E34 of the spacer flange 34 is greater than or equal to half the thickness E24 of the follower roller 24A, such that the roller 24A is entirely located on one side of the median plane P11.

Depending on the face 112 or 114 of the body 110 on which the spacer flange 34 is bearing, the offset of the follower roller 24A in relation to the median plane P11 is in one direction or the other. More generally, it is understood that two identical attachment devices 28 may be used to attach the two follower rollers 24A and 24B, the positioning of the spacer flange 34 on either of the faces 112 or 114 of the body 110 allowing the rollers 24A or 24B to be offset to one side or the other of the median plane P11. The parts of the attachment devices 28 can thus be mass-produced, which reduces manufacturing costs.

In the first embodiment, the front portion 346 of the spacer flange 34 extends into the intermediate volume V124 beyond the flange 124 of the attachment portion 124A, with the front edge 342 facing the contact surface S242 of the roller 24A. The front portion 346 comprises holes 352, which are aligned with the intermediate holes 290 of the outer flange 32, so as to allow passage of the clevis rivets 284 of the fastener 28. In the assembled configuration of the fastener 28, the spacer flange 34 is attached to the outer flange 32 by means of clevis rivets 284.

At each clevis rivet 284, a strut 36, is interposed between the inner flange 30 and the inner fastener 28A, such that the inner face 30A of the inner flange 30 and the inner face 32A of the outer flange 32 are parallel to each other and separated by a distance equal to the thickness E24 of the follower roller 24A, within the assembly clearances. In other words, the clevis rivets 284 join the inner flange 30 of the inner fastener 28A and the outer flange 32 of the outer fastener 28B, the spacer flange 34 of the outer fastener 28B and each strut 36.

In the first embodiment, the attachment device 28 comprises two clevis rivets 284 and two struts 36, which are rings in this case. Since the distance between the inner flange 30 and the outer flange 32 is, or in addition, equal to the thickness E24 of the follower roller, the thickness E36 of the struts 36 is therefore equal to the thickness E24 of the roller 24A minus the thickness E34 of the spacer flange 34.

The roller 24A is thus capped by the inner 30 and outer 32 flanges assembled by the roller rivets 280. The inner 30 and outer 32 flanges are also connected by clevis rivets 284, which help stiffen and strengthen the connection of the inner 20 and outer 32 flanges to the roller 24A. In other words, the inner fasteners 28A and outer fasteners 28B are joined by the clevis rivets 284.

The attachment device 28 according to the invention thus allows the follower roller 24A to be connected to the body 110 of the output lever 11 without the need for a specific housing to accommodate the follower roller to be formed in the faces 112 or 114 of the body 110 and without the need for a flange to be milled into the body 110, as is the case in the prior art. In addition, the inner 28A and outer 28B fasteners each include one or more plates, namely the inner, outer, and spacer flanges, which abut each other in parallel planes and are joined to each other by rivets 280 and 284.

Simple machining operations, such as bores or chamfers, are made in the body 110, in particular to make the rivet holes 282. Optionally, the surfaces 112 and 114 may include ground areas, particularly the attachment portion 124A, to allow proper geometry of the output lever 11.

A method of assembling the roller 24A to the body 110 of the output lever 11 is now described, with the understanding that the same assembly method is valid for the roller 24B.

The assembly method comprises a first step, consisting of providing the already assembled roller 24A, the body 110 of the lever 11 and the various parts of the attachment device 28, namely the inner and outer flanges 30 and 32, the spacer flange 34 and the struts 36.

The assembly method then comprises a second step consisting of stacking the inner flange 30, the struts 36, the spacer flange 34 and the outer flange 32 in a positioning tool, not shown and configured for this purpose, so as to make all the holes intended for the passage of the respective rivets coincide. In particular, the front holes 286 for the passage of the roller rivets 280, the holes 288 and 350 for the passage of the lever rivets 282 and the holes 290, 352 and 291 for the passage of the clevis rivets 284.

The assembly method then comprises a third step called "riveting", which consists of inserting the clevis rivets into the corresponding holes 290, 352 and 291 and then deforming the clevis rivets under pressure, so that the inner flange 30, the struts 36, the strut flange 34 and the outer flange 32 are joined together and form a fastening subassembly together.

During riveting, the rivets, which have an initial length slightly greater than the thickness of the stack of parts, plastically deform in the direction radial to the hole axis, thereby increasing the tightness of the rivets in the through holes. The rivets also deform at their ends so as to partially fill a chamfer in the through holes 291 and 290 of the inner and outer flanges 30 and 32.

When rivets, such as roller rivets 280, lever rivets 282 or clevis rivets 284, are used, they are preferably set at room temperature, using a so-called "cold" riveting method. Unlike hot riveting or other hot assembly methods such as welding, cold riveting does not generate localized heating in the parts to be assembled, which avoids the appearance of deformation of the parts during the assembly operation.

The assembly method then comprises a fourth step consisting of positioning the outer flange 32 of the fastener subassembly on the corresponding attachment portion 122A, so as to make the holes 288, 350 and 126 for the passage of the lever rivets 282 coincide. In the illustrated example, the outer flange 32 is positioned on the face 112 side of the body 110.

The assembly method then comprises a fifth step of inserting the lever rivets 282 into the corresponding through holes 288, 350, and 126 and then deforming the lever rivets 282 under pressure so as to secure the fastener subassembly to the corresponding attachment portion 122A.

The assembly method then comprises a sixth step of positioning the follower roller 24A between the inner flange 30 and outer flange 32 of the corresponding fastener assembly 28, so that the through holes 248 and 286 of the roller rivets 280 coincide.

The assembly method then comprises a seventh step of inserting the roller rivets 280 into the corresponding holes 248 and 286 and then deforming the roller rivets 280 under a press so as to secure the roller 24A to the fastener subassembly.

Optionally, in the first step, the bore 18 and the front holes 286 formed in the body 110, the inner flange 30 and the outer flange 32, respectively, are still only in a rough state, in which case the assembly method comprises an intermediate step between the fifth and sixth steps, consisting of reworking the holes 286 and the bore 118, so that at the end of the seventh step, the main axis A11 of the body 11 and the roller axis A24 of the follower roller 24A are parallel to each other and spaced apart by a precise amount.

This reworking compensates for any geometric deviations related to the assembly or geometric tolerances of the parts of the output lever 11.

In the second to fifth embodiments, the elements similar to those of the first embodiment have the same references and function in the same way. In the following, primarily the differences between each embodiment and the preceding embodiment(s) are described.

One of the primary differences of the second embodiment from the first embodiment is that the spacer flange 34 is not traversed by the clevis rivets 284 that join the inner flange 30 and the outer flange 32, and that the struts 36 abut the inner face 32A of the outer flange 32 and the inner face 30A of the inner flange 30.

The spacer flange 34 comprises an inner face 34A and an outer face 34B opposite the inner face 34A. When the attachment device 28 is assembled, the outer face 34B faces the outer flange 32. The spacer flange 34 also comprises a front edge 342, which faces the roller 24A in the assembled configuration of the roller 24A, and a rear edge 344, opposite the front edge 342.

A rear portion 348 of the spacer flange 34 is also defined as comprising the rear edge 344.

The rear portion 348 is interposed between the outer flange 32 and the attachment portion 122A. More specifically, the outer face 34B of the spacer flange 34 bears in parallel planes against the inner face 32A of the outer flange 32, while the inner face 34A of the spacer flange 34 bears in parallel planes against the face 112 of the body 110 of the lever 11. As a result, the follower roller 24A is offset from the median plane P11.

The rear portion 348 comprises holes 350, formed through the spacer flange 34 and intended for the passage of the lever rivets 282. Thus, in the assembled configuration of the roller 24A, the holes 126 in the attachment portion 122A, the holes 350 in the spacer flange 34, and the rear holes 288 in the outer flange 32 are aligned so as to allow the passage of the lever rivets 282.

In the second embodiment, the spacer flange 34 does not comprise a front portion extending into the internal volume V124. Here, the front edge 342 is flush with the edge 124 of the attachment portion 122A.

Accordingly, the struts 36, interposed between the outer fastener 28B and the inner flange 30, directly abut the inner face 32A of the outer flange 32 and the inner face 30A of the outer flange 30. The struts 36 are each formed in a plate and are each ring-shaped, which have a thickness E36. The thickness E36 is chosen so that the inner flange 30 and the outer flange 32 are parallel to each other and are separated by a distance equal to the thickness E24 of the follower roller 24A. In other words, the thickness E36 is chosen in this case to be equal to the thickness E24.

The structure of the lever 11 according to the second embodiment simplifies the assembly of the lever 11, but decreases its rigidity, as the spacer flange 34 does not make a connection between the clevis rivets and the lever rivets 282.

One of the primary differences of the third mode from the other embodiments is that the inner fastener 28A comprises a reinforcing flange 70, which is located on the side of the inner flange 30 and connects the clevis rivets 284 to the lever rivets 282.

The reinforcing flange 70 is formed in a plate of a rigid material such as steel and comprises an inner face 70A and an outer face 70B opposite the inner face 70A. When the attachment device 28 is assembled, the inner face 70A faces the outer flange 32.

The inner face 70A of the reinforcing flange 70 is jointly supported in parallel planes on the external face 30B of the inner flange 30 and resting in parallel planes on the face 114 of the attachment portion 122A, that is, with the face of the body 110 of the lever 11 facing away from the spacer flange 34.

The reinforcing flange 70 is, on the one hand, fixed to the attachment portion 122A by means of the lever rivets 282 and, on the other hand, fixed to the inner flange 30 by means of the clevis rivets 284. Such a structure of the lever 11 is more rigid, but more cumbersome, compared to the previous embodiments.

In the third embodiment, a thickness of the inner flange 30 is adjusted such that the outer surface 30B of the inner flange 30 is located in the same plane as the face 114 of the body 110, such that the inner face 70B of the reinforcing flange 70 is jointly abutting the face 114 and the outer face 30B of the inner flange 30.

Advantageously, the reinforcing flange 70 has a contour identical to a contour of the spacer flange 34. Advantageously, the reinforcing flange 70 has a thickness equal to the thickness E34 of the spacer flange 34, in other words, the reinforcing flange 70 is identical to the spacer flange 34, which makes it possible to manufacture the parts in series, to reduce production costs and to facilitate assembly.

In the third embodiment, the reinforcing flange 70 is provided with the other parts of the attachment device 28 in the first step of the assembly method, and then is placed in the positioning tool in the second step together with the inner flange 30.

One of the main differences between the fourth embodiment and the previous embodiments is that the struts 36, each of which is ring-shaped with a single rivet through-hole 284 in the previous embodiments, are replaced by a strut 436 formed in a plate in which a plurality of rivet through-holes 284 are formed. In addition, the clevis rivets 284 are more numerous, in this case four in number, instead of two clevis rivets 284 in the previous modes. Thus, the strut 436 comprises four clevis rivet holes 284, as detailed below.

The spacer flange 34 and the outer flange 32 are joined by two of the four clevis rivets 284, with these two clevis rivets 284 forming a so-called "front" group of clevis rivets 284.

The reinforcing flange 70 and the inner flange 30 are joined by two additional clevis rivets 284, which are different from the rivets in the front group and form a so-called "rear" group of clevis rivets 284.

The strut 436 comprises a front portion 438, in which holes 439 are formed, for the passage of the clevis rivets 284 of the front group. The strut 436 comprises a rear portion 440, in which holes 441 are formed, for the passage of the clevis rivets 284 of the rear group.

The inner flange 30 is supported on the outer fastener 28B through the strut 436. More precisely, the strut 436 is interposed between the inner face 30A of the inner flange 30 and the inner face 34A of the spacer flange 34, so that the inner face 30A of the inner flange 30 and the inner face 32A of the outer flange 32 are parallel to each other and separated by a distance equal to the thickness E24 of the follower roller 24A, within the assembly clearances.

Because of the strut 436 formed in a plate and the more numerous clevis rivets 284, the output lever 11 of the fourth mode is more rigid than the levers 11 of the previous modes. On the other hand, the lever 11 of the fourth mode has a substantially symmetrical structure in relation to the median plane P11, which reduces the bending deformations of the attachment device 28 on either side of the median plane P11 when the rollers 24A and 24B are in abutment on the followers 22A and 22B of the cam 22.

One of the main differences between the fifth embodiment and the previous embodiments is that the lever 11 of the fifth embodiment comprises a reinforcing flange 70 but does not include an equivalent to the struts 36 or 436 of the previous embodiments. In the fifth embodiment, inner fastener 28A comprises inner flange 30 and reinforcing flange 70, while the outer fastener 28B comprises outer flange 32 and spacer 34.

The inner face 70A of the reinforcing flange 70 bears in parallel planes against on the outer face 30B of the inner flange 30, the inner 30 and reinforcing flanges 70 being joined by means of the rear group of clevis rivets 284.

The outer face 34B of the spacer flange 34 bears in parallel planes against the inner face 32B of the outer flange 32, the spacer 34 and outer 32 flanges being joined by means of the front clevis rivet assembly 284.

In the fifth embodiment, each clevis rivet 284 connects only two plate members to each other, namely, in a first case, the spacer flange 34 and the outer flange 32, and, in a second case the reinforcing flange 70 and the inner flange 30. The clevis rivets 284 thus have a length that is less than a length of the rivets 284 of the preceding modes, as measured parallel to the main axis A11.

In manufacturing the fastener 28, the inner and outer fasteners 28A and 28B are first assembled separately by means of the clevis rivets 284, before proceeding to the third assembly step described for the first embodiment.

The lever 11 of the fifth embodiment, without strut, is less rigid than the lever of the fourth embodiment, while enabling a good transmission of forces to be maintained at the level of each of the inner fasteners 28A or outer fasteners 28B when the rollers 24A and 24B are bearing on the followers 22A and 22B of the cam 22, which reduces the bending deformations of the attachment device 28 on either side of the median plane P11.

More generally, regardless of the embodiment, the inner fastener 28A and outer fastener 28B of the attachment device 28 comprise one or more pieces formed in plates. The attachment device 28 also comprises struts 36, which are rings, or a strut 436 formed in a plate, or even no spacer, as appropriate. The parts of the attachment device 28 are thus easy and economical to produce.

The various parts of the attachment device 28 are also easy to assemble, the parts bearing flatly on each other and preferably being assembled by cold riveting, which reduces the risks of geometric deformation of the output lever 11 after assembly.

In all the embodiments, the fasteners 280 used to attach the inner 30 and outer 32 flanges to the roller 24A are rivets. In a variant, not shown, other fasteners may be used, in particular reversible fasteners such as a screw and a nut, which allows for easy replacement of a defective part if necessary. In this case, the head of the screw and the nut are preferably milled and received in complementary recesses of the inner and outer flanges 30 and 32, so as not to add extra thickness to the attachment device 28 and risk touching an adjacent output lever. Thus, since the follower roller is a particularly stressed part and has a higher risk of failure than other parts of the output lever 11, the roller rivets 280 can be replaced by an operator.

In all embodiments shown, the rolling elements 244 of the rollers 24A and 24B are rollers. The invention may also be implemented with rollers in which the rolling elements 244 are balls.

The above-mentioned embodiments and variants can be combined with each other to generate new embodiments of the invention.

The invention claimed is:

1. An output lever with cam follower rollers of a cam shed-forming mechanism, the output lever comprising a body and two follower rollers, wherein:

the body of the output lever, formed in a plate with two opposite faces defining between them a median plane, comprises a central portion with two opposite surfaces in which a bore is formed, centered on a main axis receiving a bearing, two attachment portions and an extension, the attachment portions and the extension being formed radially to the main axis and being distinct from each other each follower roller is offset from the median plane along the main axis and comprises an inner ring, an outer ring and rolling elements interposed between the inner and outer rings such that the outer ring is free to rotate relative to the inner ring about a roller axis parallel to the main axis, the outer ring has a contact surface, which is radial to the roller axis and intended for contact with a follower of a cam of the shed-forming mechanism, each follower roller is connected to a respective attachment portion by means of a respective attachment device, each attachment device comprising an inner fastener located on the side of the other follower roller relative to the inner ring and an outer fastener located on the opposite side of the other follower roller relative to the inner ring, the inner and outer fasteners each comprising one or more flanges, each of which is formed in a plate, which are supported in parallel planes with each other and are connected to each other, each follower roller is clevis-mounted between an inner flange of an inner fastener and an outer flange of an outer fastener and is secured to the inner and outer flanges by an attachment device, the outer fasteners are assembled to the corresponding attachment portion by lever rivets, the outer fastener being supported in parallel planes on one of the faces of the corresponding attachment portion such that the contact surfaces of the two follower rollers are located on either side of the median plane, wherein:

at least one of the follower rollers, called the first follower roller, is fixed to a first of the two attachment portions by means of a first attachment device, the first attachment portion of the output lever comprises two opposite surfaces which are connected to each other by an edge and which are separated from each other by a distance equal to a thickness of the central portion, each of the two surfaces of the first attachment portion is coplanar with a respective surface of the central portion, and the contact surface of the first follower is located opposite the flange of the first attachment portion.

2. The output lever according to claim 1, wherein the inner and outer fasteners of the first attachment device are joined by clevis rivets.

3. The output lever according to claim 2, wherein the outer fastener comprises an outer flange and a spacer flange, the outer and spacer flanges each being formed in a respective plate and being joined together by riveting, the outer flange having an inner face and an opposing outer face, the inner face of the outer flange bearing on the first follower roller the outer flange being fixed to the first follower roller by the attachment device, while the spacer flange is assembled to the first attachment portion by means of the lever rivets, the spacer flange being interposed between the outer flange and the first attachment portion so as to offset the inner face of the outer flange from a first of the two surfaces of the first attachment portion.

4. The output lever according to claim 1, wherein the inner fastener of the first fastening system comprises an inner flange, which is provided in a plate and has an outer face and an opposite inner face and which rests on the first follower roller, the inner flange being fixed to the first follower roller by means of the attachment device, and wherein the inner flange is supported on the outer fastener by means of one or more struts provided in a plate, so that the inner face of the inner flange and the inner face of the outer flange are parallel to each other and separated by a distance equal to the thickness of the first follower roller, except for assembly clearances.

5. The output lever according to claim 4, wherein each strut is secured to the inner flange and the outer fastener by one or more clevis rivets.

6. The output lever according to claim 5, wherein the one or more clevis rivets secure the spacer flange of the outer fastener and each strut to the inner flange of the inner fastener and the outer flange of the outer fastener.

7. The output lever according to claim 1, wherein the inner fastener comprises a reinforcing flange, which is formed in a plate and has an inner face and an opposite outer face, the inner face of the reinforcing flange jointly abutting the outer face of the inner flange and a second of the two surfaces of the first attachment portion, the reinforcing flange being fixed to the first attachment portion by means of the lever rivets on the one hand and, on the other, fixed to the inner flange by means of the clevis rivets.

8. The output lever according to claim 1, wherein the two follower rollers are mounted to a respective attachment portion by means of a respective attachment device, each attachment device being similar to the first attachment device.

9. The output lever according to claim 8, wherein the outer flanges of the two attachment devices are identical.

10. The output lever according to claim 8, wherein the inner flanges of the two attachment devices are identical.

11. The output lever according to claim 8, wherein each attachment device comprises two fasteners, such as rivets, each inner ring has a disk shape centered on the respective roller axis and defines an inner half disk and an outer half disk complementary to the inner half disk, the inner half disk of each follower roller being located on the side of the other follower roller, and wherein the fasteners of each follower roller are formed in the outer half disk of that follower roller.

12. A mechanical cam shed-forming mechanism, further comprising an output lever according to claim 1.

13. A loom comprising a mechanical cam shed-forming mechanism, wherein the shedding machine is according to claim 12.

14. A method of assembling an output lever according to claim 4, wherein the method comprises, for at least one of the rollers, the steps of:
   a) stacking the inner flange, the struts, the spacer flange and the outer flange in a positioning tool, so that all through holes of the clevis rivets coincide;
   b) inserting the clevis rivets into the corresponding through holes and then deforming the clevis rivets under pressure so that the inner flange, the strut, the spacer flange and the outer flange are connected to each other and together form an attachment subassembly;
   c) positioning the outer fastener of the fastener subassembly over the corresponding attachment portion so that the through holes of the lever rivets coincide;
   d) inserting the lever rivets into the corresponding through holes and then deforming the lever rivets under pressure so as to secure the fastener subassembly to the corresponding attachment portion;
   e) positioning the follower between the inner and outer flanges of the corresponding fastener so that the through holes of the attachment device coincide, and
   f) inserting the attachment device into the corresponding through holes and then deforming the attachment device under pressure so as to secure the follower to the fastener subassembly.

15. An assembly method according to claim 14, wherein the inner fastener comprises a reinforcing flange, which is formed in a plate and has an inner face and an opposite outer face, the inner face of the reinforcing flange jointly abutting the outer face of the inner flange and a second of the two surfaces of the first attachment portion, the reinforcing flange being fixed to the first attachment portion by means of the lever rivets on the one hand and, on the other, fixed to the inner flange by means of the clevis rivets, wherein, in step a), the reinforcing flange is placed together with the inner flange, and that, after step b), the reinforcing flange is part of the fastener subassembly.

16. The assembly method according to claim 14, in which the assembly method comprises an intermediate step, subsequent to step d) and prior to step e), the intermediate step consisting of reworking the holes through which the fastening devices pass and the bore of the body of the lever.

* * * * *